United States Patent
Afshar et al.

(10) Patent No.: US 9,501,266 B2
(45) Date of Patent: *Nov. 22, 2016

(54) PARADIGM IN MULTIMEDIA SERVICES CREATION METHODOLOGY, AND NEW SERVICE CREATION AND SERVICE EXECUTION ENVIROMENTS

(71) Applicant: AT&T Intellectual Property II, L.P., Atlanta, GA (US)

(72) Inventors: Siroos K. Afshar, Manalapan, NJ (US); Nancy Conley, Ocean Township, NJ (US); Keith Kiser, New Hope, PA (US); William J. Leighton, III, Scotch Plains, NJ (US); Dinesh N. Lokhande, Marlboro, NJ (US); Patricia E. Mccrink, Red Bank, NJ (US); Shapour Neshatfar, Jersey City, NJ (US); Boguslaw J. Olszowy, Middletown, NJ (US); Rajiv Patel, Manalapan, NJ (US); Sudhakar Rajamannar, Edison, NJ (US); Mark Szachara, Kendall Park, NJ (US); Eberhard F. Wunderlich, Princeton, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/155,468

(22) Filed: Jan. 15, 2014

(65) Prior Publication Data
US 2014/0130010 A1    May 8, 2014

Related U.S. Application Data

(63) Continuation of application No. 13/082,488, filed on Apr. 8, 2011, now Pat. No. 8,667,503, which is a continuation of application No. 12/214,191, filed on Jun. 17, 2008, now Pat. No. 7,926,063, which is a continuation of application No. 09/514,149, filed on Feb. 28, 2000, now Pat. No. 7,509,648.

(51) Int. Cl.
*G06F 3/00* (2006.01)
*G06F 9/44* (2006.01)
(Continued)

(52) U.S. Cl.
CPC ............. *G06F 8/34* (2013.01); *G06F 3/04817* (2013.01); *G06F 9/54* (2013.01); *G06F 9/542* (2013.01); *G06F 17/30017* (2013.01); *G06F 2209/544* (2013.01)

(58) Field of Classification Search
CPC ........................... G06F 9/542; G06F 3/04817
USPC ........................................ 719/310; 715/700
See application file for complete search history.

(56) References Cited

U.S. PATENT DOCUMENTS 5,261,043 A * 11/1993 Wolber et al. ................ 715/809
5,301,336 A    4/1994 Kodosky et al.
(Continued)

OTHER PUBLICATIONS

Kaplan, An Introduction to the Processing Graph Method, Mar. 24, 1997.*

(Continued)

*Primary Examiner* — Lechi Truong
(74) *Attorney, Agent, or Firm* — Chiesa Shahinian & Giantomasi PC

(57) ABSTRACT

The present invention discloses a new paradigm in Multimedia Services Creation Methodology, and new Service Creation and Service Execution Environments, based on this methodology. A service designer can access the Service Creation Environment via a Web based Graphical User Interface (GUI), to design new service in an automated way. The design process includes creation of the Service Logic Script (SLS), and associated databases that are used for storage of service and subscriber related data. The service developer (user) assembles Language Graphical Objects (LGO) into Service Logic Script. LGOs are part of a new graphical language that has been developed to meet multimedia service creation needs. They represent service control and call control primitive functions that have to be performed, in order to provide a multimedia service to service subscribers.

17 Claims, 10 Drawing Sheets

(51) Int. Cl.
*G06F 9/54* (2006.01)
*G06F 3/0481* (2013.01)
*G06F 17/30* (2006.01)

(56) References Cited

U.S. PATENT DOCUMENTS

| | | |
|---|---|---|
| 5,652,909 A | 7/1997 | Kodosky |
| 5,664,216 A | 9/1997 | Blumenau |
| 5,812,533 A | 9/1998 | Cox et al. |
| 5,881,144 A * | 3/1999 | Havens .................. 379/201.05 |
| 5,894,574 A | 4/1999 | Whited |
| 5,907,607 A | 5/1999 | Waters et al. |
| 5,950,228 A | 9/1999 | Scales et al. |
| 5,991,803 A | 11/1999 | Glitho et al. |
| 6,002,941 A * | 12/1999 | Ablay et al. .................. 455/518 |
| 6,003,031 A | 12/1999 | Hartikainen et al. |
| 6,229,337 B1 | 5/2001 | Xiao et al. |
| 6,351,646 B1 | 2/2002 | Jellema et al. |

OTHER PUBLICATIONS

Sven Erik Mattsson, Modelica: An International Effort to Design the next Generation Modelling Language, 1997.*
James Arthus Kohl: Use of Paradise: A Meta-Tool for Visualizing Parallel Systems, 1991.
IBM, Graphical Network Analyzer, Dec. 1993.
Norbert Kajker, A Survey of User Interfaces for Computer Algebra Systems, 1994.
Elie Najm, From SIBs to distributed objects: A transformation Approach for Service Creation, 1999.
Objectives and Scope, Sun Microsystem, 1999.

* cited by examiner

PARADIGM IN MULTIMEDIA SERVICES CREATION METHODOLOGY, AND NEW SERVICE CREATION AND SERVICE EXECUTION ENVIROMENTS

CROSS-REFERENCE TO RELATED APPLICATIONS

This application is a continuation of U.S. patent application Ser. No. 13/082,488 filed Apr. 8, 2011 which issued as U.S. Pat. No. 8,667,503 on Mar. 4, 2014, which is a continuation of U.S. patent application Ser. No. 12/214,191 filed Jun. 17, 2008 which issued as U.S. Pat. No. 7,926,063 on Apr. 12, 2011, which is a continuation of U.S. patent application Ser. No. 09/514,149 filed on Feb. 28, 2000 which issued as U.S. Pat. No. 7,509,648 on Mar. 24, 2009, all of which are hereby incorporated by reference in their entirety.

FIELD OF THE INVENTION

The invention relates to Multimedia Services, and more particularly to methods and environments for creating and executing Multimedia Services in the network.

BACKGROUND ART

With unprecedented growth in Internet traffic and emergence of IP Telephony and new Multimedia Services, there is a great need to decouple service development and service deployment from underlying, frequently changing network technology. This is driven by competitive market pressures to attract new customers by offering bundled services, at a competitive price, with minimum time to market. In addition service customers are expecting more control over subscribed to services, and the capability to modify the services. This alone, puts new demands on service creation methodology to shorten service development cycle, and on service creation environment to be user friendly, accessible via Internet, and to allow for third party application development. Applications are run in service execution environment, which has to be highly reliable, scalable, and capable of executing any registered application, independently of this where this application was created.

The networks currently deployed to provide Internet Telephony and Multimedia Services have prescribed service logic that offers limited functionality, at best. Typically, there are dedicated servers, which provide a service with a logic programmed in Java, C++, or other programming language. The limited flexibility dramatically limits the features available to subscribers of the IP Telephony and Multimedia Services. Thus, there is a great need for a new paradigm in service creation methodology and associated with it service creation and service execution environments.

SUMMARY OF THE INVENTION

Briefly, the present invention discloses a new paradigm in Multimedia Services Creation Methodology, and new Service Creation and Service Execution Environments, based on this methodology. A service designer can access the Service Creation Environment via a Web based Graphical User Interface (GUI), to design new service in an automated way. The design process includes creation of the Service Logic Script (SLS), and associated databases that are used for storage of service and subscriber related data. The service developer (user) assembles Language Graphical Objects (LGO) into Service Logic Script. LGOs are part of a new graphical language that has been developed to meet multimedia service creation needs. They represent service control and call control primitive functions that have to be performed, in order to provide a multimedia service to service subscribers. LGOs are independent of each other, they have attributes, and they pass a token to their next object(s) at certain points, as determined by their internal logic, during their execution. Therefore, several objects can be executing simultaneously at the same time. An object may change its internal state, including changing it to "in-active", in reaction to some of the events it may receive from network and based on its internal logic. This captures asynchronous operation of the network, and is hidden from the user. In the process of Service Logic design, service announcements can be typed in, automatically converted to speech, and stored in a waveform file, for future use during the service instantiation.

The service designer also defines service and user data as may be necessary to offer and execute the service. Data definitions are translated into database schema and the schema is used to create databases for service and subscriber information storage, and to generate Service Provisioning and Subscriber Tuning Forms. Subsequently, the service designer translates the service logic so defined, installs the results in a Service Execution Environment (SEE), and makes the service available for subscription and provisioning. A service manager provisions the service, and provides different service access authorization levels to the registered service subscribers. Service subscribers can fine-tune the service, and invoke it.

When Service Logic is invoked, based on a subscriber profile, the SEE identifies and locates the service, instantiates it, and loads the generated compiled programming components (e.g., Java objects) and the associated data into the execution environment.

Java objects, for example, control Application Programming Interfaces (APIs) exposed in the SEE. All network resources are controlled indirectly via interfaces accessible in Service Execution Environment. The translation from graphical to executable lower level language objects, as well as installation of the newly developed script, creation of the service and subscriber databases, and generation of the forms is done automatically and transparently to the user of the Service Creation Environment. According to one embodiment of the invention, the Service Creation Environment comprises an Editor, a Translator, a Data Repository, a Service Provisioning Form Generator, a Subscriber Tuning Form Generator, and a Text-to-Speech Conversion Engine. According to one embodiment of the invention, the Service Execution Environment comprises a Service Locator, a Service Instantiator, and a Service Logic Executor.

BRIEF DESCRIPTION OF THE DRAWINGS

The foregoing summary of the invention as well as the following detailed description of the preferred embodiments is better understood when read in conjunction with the accompanying drawings, which are included by way of example, and not by way of limitation with regard to the claimed invention:

DETAILED DESCRIPTION

Figure 1:
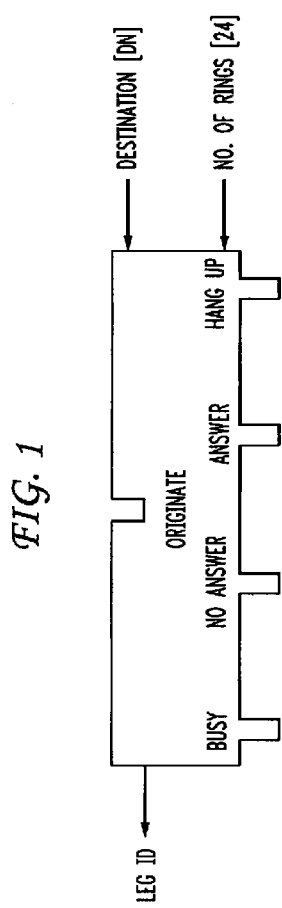
FIG. 1 illustrates an ORIGINATE TO Language Graphical Object according to one embodiment of the present invention.

The Simple Extensible and Adaptive Graphical User Language (SEAGUL) is a GUI based, user friendly, intuitive language that has been invented specifically for Multimedia Service Creation applications. This language allows for automated service creation and third party service development. With language extensions for automated provisioning, the time to market for every new service developed and deployed will be cut dramatically.

SEAGUL's basic constructs are called Language Graphical Objects (LGOs). These are interlocking building blocks used by a service developer to create a Service Logic Script, a feature, which can be used by the communications network. As will be explained in more detail below, each LGO represents a unique service control/call control function, it has its own attributes, and it is fired to execute via its input. At certain points during its execution it passes a token to fire a next LGO via its output. Depending on the LGO function, it can stay in the "fired" state (active) even after the executable token was passed to the next LGO. SEAGUL is designed to allow for simultaneous execution of multiple LGOs at the same time, which reflects the asynchronous nature of the underlying telecom network architecture. Furthermore, users can develop and add new LGOs, following LGO development guidelines. It is a live language, which can grow to accommodate new technologies and equipment that will be created in the future. In order to add a new LGO to the language definition, it is necessary to follow strict LGO development guidelines, regarding executable inputs/outputs, number of inputs/outputs, LGO firing and turning off rules, attributes definition, etc. Every new LGO that has been developed should have a capability to install itself in a Service Creation System, and advertise its attributes, which have to be made available to other LGOs for their execution.

There are a plurality of variables that a LGO may use such as system variables, service variables, subscriber variables and local variables. System variables are always available to any service logic script. System variables are provided by SLEE, and accessible by all LGOs used in a service logic Examples of system variables are Automatic Number Identification (ANI), Destination Number (DN), Call ID, current time, current date, service ID, etc., but the invention is not limited thereto.

ANI is the caller's line number, used for subscriber identification and billing purposes. ANI may be one of several types; for example, it may follow the E.164 standard numbering convention or it may simply be an IP address. Its value depends on its type: When expressed as E.164, for example, it has Country Code (CC)+National Number (NN), where CC (1, 2, 3 digits), and NN (up to 12 digits).

DN is the called party's telephone number or IP address. It also may be one of several types; for example, it may follow the E.164 standard numbering convention as explained above or it may be an IP address Call ID is a globally unique non-zero value associated with a given call, which is created by the originating endpoint. It is passed with all call related messages, which are relevant to the given call, during a call set-up, call modifications, and call tear-down. The format is protocol specific. Current Time is the actual time, expressed in the format (hh:mm:ss). For example, it can be set to Standard Eastern Time. Current date is the actual date, expressed in the format (mm:dd:yy). For example, it is the date within Standard Eastern Time Zone. Service ID is a unique non-zero value within an Administrative Zone, associated with a given service. Event is an occurrence of a specified incident that has been described in advance, is detectable by underlying network, and triggers some further action upon its detection.

Service variables are specific to the service and their values are set to default in declaration block by the service developer. They may get changed during service provisioning process.

A service variable declaration process is used to declare service variables, which are used by Service Logic during script execution. Each of the service variables is of a declared type and it has a declared name. Multiple service variables can be defined at a time. Some of these variables are provisioned during the provisioning process, and all of them are provided by the SLEE at the time of service instantiation.

Service variables are displayed in a "Service Variables Form". The button "New" in "Service Variables Form" will allow a user to declare a new service variable defined by the user. When "New" is selected a "Service Variable NEW Form" will be displayed with following information:
Type of Service Variable: _____, Name of Service Variable: _____
A pull down menu will be displayed for the type selection. If the type is other than a basic data type, then additional information needs to be specified. In case of a table type, index and type values for the table have to be specified. The service developer has to type the Name of the Service variable. Based on service variables, Service Provisioning Forms are generated.

A subscriber variable declaration process is used to declare subscriber modifiable variables. Each of the subscriber modifiable variables is of a declared type and it has a declared name. Multiple subscriber modifiable variables can be declared at a time, using the same mechanism described in a new service variable declaration earlier. Based on these variables, "Subscriber Data Forms" are generated. The use of subscriber data variables in a Logic Script is not mandatory.

Subscriber modifiable variables are displayed in a "Subscriber Data Form". The button "New" in "Subscriber Data Form" will allow the user to declare subscriber modifiable variables defined by the service developer. When "New" is selected a "Subscriber Data NEW Form" will be displayed with following information:

Type of Service Subscriber modifiable Variable: _____, Name of Service Subscriber modifiable variables: _____
A pull down menu will be displayed for a type selection. If the type is other than a basic data type, then additional information needs to be specified. In case of a table type, index and values for the table have to be specified. A service developer has to name the service subscriber modifiable variables.

Local variables can be set in a declaration block or their value changed/set during script execution. All system, service, subscriber modifiable, and local variables are available to all LGOs throughout the life of Service Logic Script.

A local variable declaration process is used to declare local service variables. Each of the local variables is of a declared type and it has a declared name. Multiple local variables can be declared at a time, using the same mechanism as it is described in a new service variable declaration, earlier. The use of local variables in a Logic Script is not mandatory. Local variables are set during Service Logic script execution.

Local variables are displayed in a "Local Variables Form". The button "New" in "Local Variables Form" will allow a user to declare Local variables defined by the service developer. When "New" is selected, a "Local Variables NEW Form" will be displayed with following information: Type of Local Variable: _____, Name of Local variable: _____
A pull down menu will be displayed for a type selection. If the type is other than a basic data type, then additional information needs to be specified. In case of a table type, index and values for the table have to be specified. The service developer has to name the local variables.

As set forth above, Language Graphical Objects (LGOs) are basic building blocks in the SEAGUL Language. The blocks are interlocking, with varying sizes of notches and varying number of extending bulges. These are used to enforce the rules for their connectivity. Every LGO performs a unique service control/call control function, and has associated attributes and has executable Inputs/Outputs. A LGO can have zero or one executable Input. A LGO is turned on when its input is fired. More than one LGO can be turned on at the same time during Service Logic script execution. A LGO can turn itself off whenever it decides that it is appropriate. All LGO that are turned on are turned off when an END LGO is encountered in Service Logic Script, during script execution. A LGO can have zero, one, or more than one outputs. A LGO can have zero, one, or more than one attribute. A LGO is defined independently of any service or of any other LGO block.

FIG. 1 illustrates an interlocking block, which represents the ORIGINATE TO function, for example. As the name implies, the LGO originates a call to a given destination. It has one input (three notches wide) and four outputs (three bulges wide each). A token, which fires a block to begin its execution, is passed from an output of the preceding block to the input of the following block. The ORIGINATE TO block can be preceded by a block, which has three or less bulges, fitting into its three notches wide input. The same rule applies to the block following the ORIGINATE TO block. Each output of the ORIGINATE TO block can connect only with a block, which has three or more notches cut out at its input. In general, the number of notches and bulges can vary, depending on allowed connectivity to other blocks in a service script or the number of notches and bulges can be the same, for example, one, for every input and output.

The ORIGINATE TO block has attributes which are input and output parameters needed to perform its function. The ORIGINATE TO block requires a destination number, in order to originate a call, and an indication of the number of rings after which it stops ringing because the destination number is busy or unanswered. It outputs a call leg ID, of a newly created call leg, as a result of its completed function. The ORIGINATE TO block remains active when the token is passed to the next block until it detects that the called party has hung up at which point it passes a token over its "on-hook" output and it turns itself off.

Language Graphical Objects represent service control and call control primitive functions that have to be performed in a network in order to provide a multimedia service to service subscribers. Language Graphical Objects are independent of each other, they have attributes, and they pass a token to the next object at certain points in their execution. Several objects can be executing simultaneously at the same time. An object can terminate its own execution based on the events it receives from the network and according to its internal logic. This captures the asynchronous nature of the network operation and is hidden from the user.

The following is a list of exemplary LGOs that have been created but the invention is not limited thereto: BEGIN, END, TABLE GET, MEMBER OF A LIST, TEST, FOR EVERY, REAPEAT, MONITOR, ORIGINATE TO, CONNECT, ESTABLISH SESSION, MAIL, JOIN, DISCONNECT, LOG, PLAY, COLLECT, and WAIT.

Figure 2:
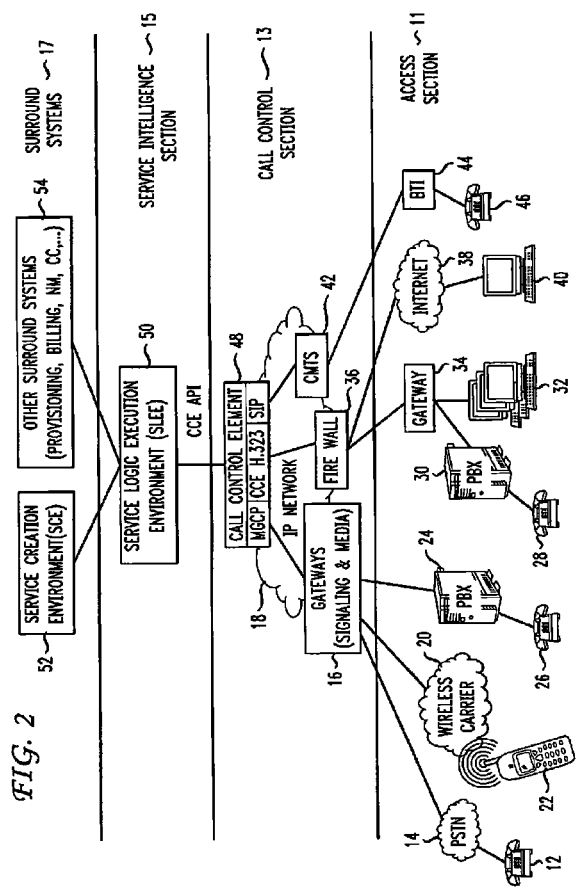
FIG. 2 illustrates a voice over IP network according to one embodiment of the present invention.

A communication system that can use the above-described LGOs to provide a variety of services is illustrated in FIG. 2. It will be understood that the inventive idea of using LGOs to create a plurality of services or functions is not limited to communication systems only; the idea is domain independent and can be used in a variety of domains. An IP-based telecommunications network having programmable logic is described in U.S. patent application Ser. No. 09/192,781, entitled "IP-Based Telecommunications Network Having Programmable Logic" and filed on Nov. 16, 1998, which is incorporated herein by reference.

FIG. 2 illustrates a schematic diagram of an apparatus in the form of a voice over IP network 10 for providing telephony services across a network of inter-worked computers, between a called multimedia service customer, represented by a PC, and a calling party, represented by a station set. The network 10 can be divided into four sections: an access section 11, a call control section 13, a service intelligence section 15, and surround systems 17.

People can gain access to the network 10 using a variety of devices. FIG. 2 illustrates a variety of devices for connecting to an IP network 18, but these examples are illustrative and are not intended to be restrictive. For example, a standard telephone 12 or fax machine connected to the Public Switched Telephone Network (PSTN) can be connected through a gateway 16 to the IP Network 18. Likewise, a cellular telephone connected to a wireless carrier 20 or a standard telephone 26 connected to a PBX 24 can be connected to the IP network 18 through the gateways 16. Furthermore, a PBX 30 or computers 32 can be connected to the IP network through a gateway 34 and a fire-wall 36. A computer 40 connected to the Internet 38 can also be connected to the IP network 18 through the fire-wall 36 but can also be directly connected to the IP network 18. A standard telephone 46 can also be connected to the IP network 18 through a BTI 44 and a CMTS 42.

As noted above, the IP and PSTN networks are interconnected via gateways. A gateway converts an incoming voice/fax/multimedia call into packets suitable for transmission over an IP network 18, and vice versa. An IP formatted call is converted back to PSTN for delivery to the end customer. Depending on the nature of each call it receives, each gateway may require certain logic, (e.g., instructions and/or data) to complete such a call. For example, a caller initiating a call from the telephone 12 may be calling a person, who subscribes to certain special features, such as "Follow Me". This particular feature redirects a call depending on time of the day to different destination numbers.

Gateways generally lack call processing logic to process special features. To obtain the logic necessary to process such a call, each gateway makes a request for such logic to a Call Control Element (CCE) 48, which can be Gatekeeper or Softswitch in the network but is not limited thereto. Since the Call Control Element 48 does not have direct access to the service logic itself, it forwards the request to a Service Logic Execution Environment (SLEE) 50. The Service Logic Execution Environment identifies the logic associated with a subscribed feature, and then initiates its execution. In this way, the requesting gateway receives the appropriate instructions on a call-by-call basis. The Service Logic Script and associated databases are created using Service Creation Environment (SCE) 52 and other surround systems 54. The operation of the Service Logic Execution Environment 50, the Service Creation Environment 52 and the other surround systems 54 will be explained in more detail below.

The processing involved in the created services can be split between a network and a subscriber's device. The amount of intelligence the subscriber's device has can be used to determine how much processing the subscriber's device handles and how much the network handles. Thus, the created services can be subscriber dependent rather than service dependent.

There are several types of users that need to be considered when defining Service Creation Environment. They vary in terms of the level of flexibility that they require and the level of expertise they pose with programming and telecom issues. The first type of user are telecom developers. These users have knowledge of Application Programming Interfaces that are exposed in Service Execution Environment and can create Service Logic using some programming languages (e.g. Java). They can also create Service Logic Components, like Language Graphical Objects, which are used by developers less experienced in programming languages, like a group of service developers. The service developers are the users that create and/or modify a service using a new Paradigm in Multimedia Service Creation Methodology and Service Creation and Service Execution Environments, based on this methodology. A service developer creates or modifies a service by assembling Language Graphical Objects to create an executable script. For example, a service developer can go to a Web page of the service provider for a specific service, such as "Follow-Me" and modify the service by adding LGOs to or subtracting LGOs from the basic "Follow-Me" service script. Service subscribers can also affect the operation of a design feature or service. For example, depending on the service, the subscriber may be prompted in a variety of ways to enter subscriber modifiable data that is needed by the LGOs of a service. For example, a subscriber who subscribes to the "Follow-Me" service will be prompted to enter a list of telephone numbers or IP addresses.

When Language Graphical Objects execute, they are translated into programming language objects, like Java objects, which control the Application Programming Interfaces exposed in the Service Execution Environment. All network resources are controlled indirectly via interfaces accessible in the Service Execution Environment. The translation from graphical to executable lower level language objects, as well as installation of the newly developed script and creation of the service databases is done automatically, and transparently to the user of the Service Creation Environment.

Figure 3:
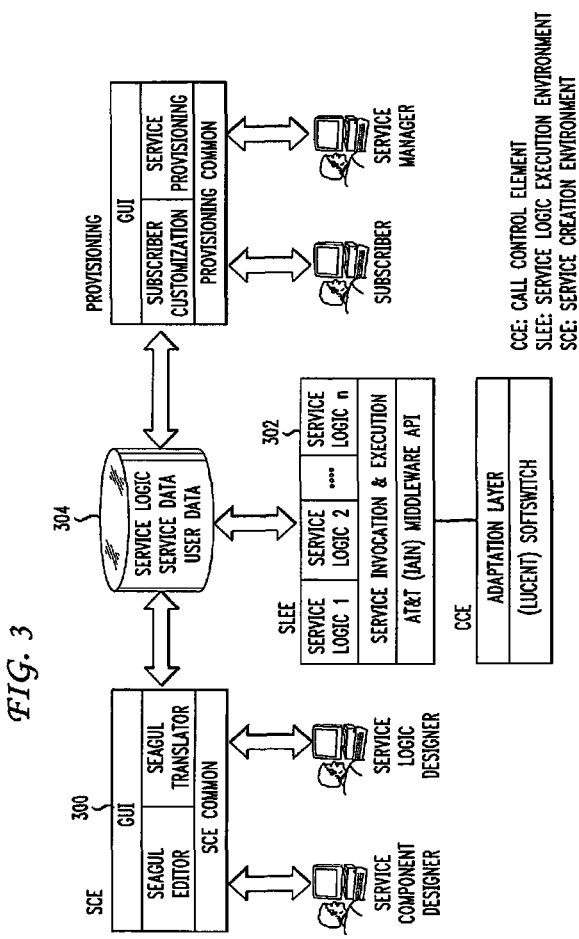
FIG. 3 illustrates an overview of the Service Creation Environment architecture and the Service Execution Environment architecture in a system according to one embodiment of the present invention.
Figure 4:
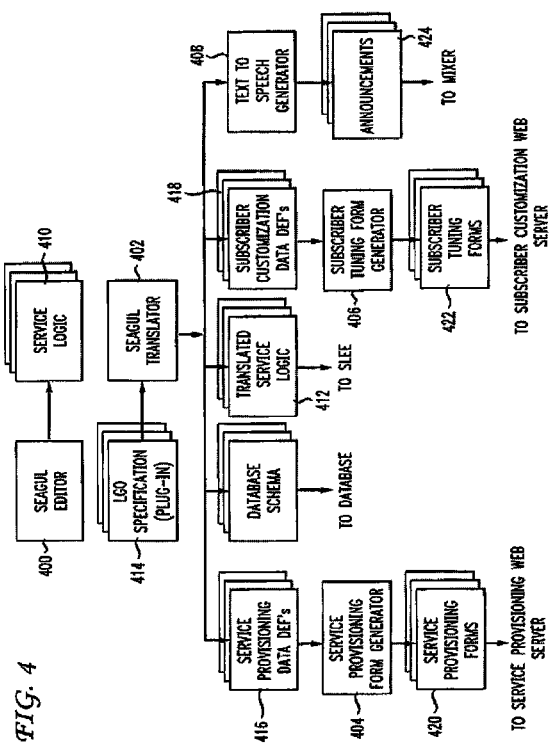
FIG. 4 illustrates the Service Creation Environment architecture according to one embodiment of the present invention.
Figure 5:
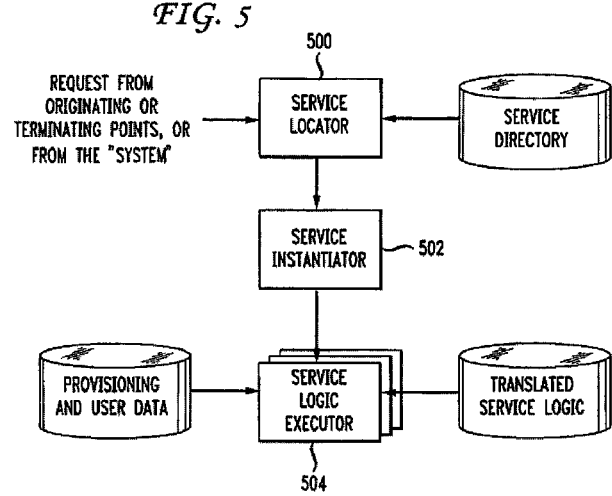
FIG. 5 illustrates the Service Execution Environment architecture according to one embodiment of the present invention.

The Service Creation Environment architecture and the Service Execution Environment architecture are illustrated in FIGS. 3-5. The Service Creation Environment architecture 300 consists of an Editor 400, a Translator 402, a Service Provisioning Form Generator 404, a Subscriber Tuning Form Generator 406, and a Text-to-Speech Conversion Engine 408. The service designer creates a new service by assembling Language Graphical Objects into Service Logic script 410, via Graphical User Interface in the Editor 400. Subsequently, the Service Logic 410 gets translated into executable code 412 in the Translator 402, by replacing LGO graphical images with their compiled Java code. The LGOs have their code already compiled into Java Objects, which are called "plug-ins" 414. They are fetched into a Service Logic executable program every time, when a LGO appears in the Service Logic script.

In the Editor 400, there are also provisions to define service 416 and subscriber 418 data types. Service data definition is used by the Service Provisioning Form Generator 404 to automatically create forms 420 displayed for service provisioning, and to automatically create databases which are used to store service related information. The forms 420 are displayed and data populated during service provisioning process. Service data is invoked during service instantiation.

Similarly, subscriber data definition is used by the Subscriber Tuning Form Generator 406 to automatically create forms 422 displayed for subscriber self-provisioning (modification), and to automatically create databases which are used to store subscriber modified related information. The forms 422 are displayed and data populated during subscriber self-provisioning (modification) process. Subscriber modified data is invoked during service instantiation.

The Text-to-Speech Engine 408 converts text announcements into a synthesized speech announcements 424. The service designer can type-in announcements, which are part of the Service Logic. Upon their conversion to speech, the announcements are stored in a waveform file.

The Translator 402 translates graphical language images into programming language objects, like Java objects, which are executed in the Service Execution Environment. Service control and call control functions of the graphical objects are mapped into service control and call control functions of the Application Programming Interfaces (APIs), which are exposed in the Service Execution Environment. Dependencies are established between service control function or call control function of the graphical objects and event notifications sent from Service Execution Environment. Next state of the service control or call control function is determined upon its completion or upon receiving an event notification from the Service Execution Environment.

A Data Repository 304 stores all system data, service data including subscriber data, and subscriber modifiable data. System data is the data common and available to all services, like, for example, current time, current date, destination number, and ANI. Service data is service specific, like service announcements, for example. Service data also includes customer data, like a Personal Identification Number (PIN), for example. Subscriber modifiable data is the data which can be self provisioned by the service subscriber. For example, it can be the destination numbers in "Follow Me" service.

Although the Service Execution Environment is a separate layer in architectural framework illustrated in FIGS. 3-5, it performs important functions, closely related to Service Creation Environment. The Service Execution Environment performs: dynamic loading of code (SLS); determines which code to run for a call; provides the execution context for each SLS; and performs other execution management tasks.

The Service Execution Environment Architecture 302 is shown in detail in FIG. 5. The Service Execution Environment consists of a Service Locator 500, a Service Instantiator 502, and a Service Logic Executor 504. The Service Locator 500 performs a function of identifying Service Logic, based on the service subscriber ID. The Service Locator function comprises selecting a service ID, and finding the Service Logic Execution Environment, in which the logic is stored. In case, when a service customer subscribers to several services, another function of the Service Locator 500 called "Feature Interaction", is invoked to resolve the conflict and invoke one service logic, or their allowed combination, at a time. The invoked Service Logic is instantiated in the Service Instantiator 502 with all service and user data, and is ready to be executed in Service Execution Environment. The Service Logic Executor 504 manages all aspects of execution of all the service logic scripts, which are run in a given Service Logic Execution Environment. In particular, it includes loading executable Service Logic Code, reading and storing service and user data, providing inter-process communication between various Service Logic scripts that are being executed at the same time, and communications between executing service logic scripts and Call Control Elements.

Other elements shown in FIG. 3, which are considered network resources, and are controlled via LGOs functionality are IVRs, for example. These are network elements, which play announcements, providing service subscribers with call, service, or network relevant information. They are also capable of collecting information from a service subscriber, like PIN, for example. The service developer designs announcements as part of the Service Logic Script, in a text form, which is translated automatically into voice by a text-to-voice conversion system.

Not shown in FIG. 3 is a link to a billing system, which exists, in a real network. LGOs provide capability to capture any events and to log them on a file for billing purposes. It is conceivable that Billing CDR could eventually be created the same way as the provisioning scheme is created in the Service Creation Environment.

Language Graphical Objects Detailed Description

A plurality of exemplary LGOs will now be described in detail. As noted above, the following LGOs are illustrative and not restrictive and new LGOs created using the present invention are within the scope of the present invention.

Figure 6:
FIGS. 6-23 illustrate various Language Graphical Objects according to one embodiment of the present invention.

The BEGIN LGO, illustrated in FIG. 6, starts the Service Logic script. Its execution is initiated based on service customer "off-hook" action and dialed digits. Service customer "off-hook" action may be followed by an immediate "on-hook" action. Therefore, token can be passed to one of the two outputs, "on-hook" or "off-hook". On fatal error, the BEGIN LGO terminates program execution.

TABLE 1

| | | | BEGIN Inputs/Outputs: | | | |
|---|---|---|---|---|---|---|
| I/O | Attribute | Attribute type | Display name | Default value | Possible values | Select mode |
| Input | None | | | | | |
| Output | None | | | | | |

The BEGIN block has no inputs. When an Off-hook condition is detected, the BEGIN block passes a token to the next LGO when BEGIN was executed successfully based on service customer "off-hook" action. When an On-Hook condition is detected, the BEGIN block passes a token to the next LGO when BEGIN was executed successfully based on service customer "on-hook" action. In the On State, BEGIN gets fired into "On State" by SLEE and it remains in this state until either there is Caller hang-up event, or END is executed. In the Off-state, BEGIN turns itself off into "Off state" when there is a Caller Hang-up event. BEGIN is turned off into "Off state" by a Service Logic execution controlling program when it encounters END in the Service Logic script. The rule of use for the BEGIN block is that BEGIN is always the first LGO in the Service Logic script.

Figure 7:

The END LGO, illustrated in FIG. 7, stops the service logic execution script. On fatal error, the END LGO terminates program execution.

TABLE 2

| | | | END Inputs/Outputs: | | | |
|---|---|---|---|---|---|---|
| I/O | Attribute | Attribute type | Display name | Default value | Possible values | Select mode |
| Input | None | | | | | |
| Output | None | | | | | |

The END LGO receives a token from preceding LGO, when it has finished its execution and the END LGO has no outputs. In the On State, the END LGO gets fired into "On State" by the token passed from the preceding LGO on a script execution list. In the Off-state, the END LGO sends a message to script execution control program to turn off into "Off state" all of the turned on in "On state" LGOs, and than immediately turns itself off into "Off state". The END LGO is always the last executed LGO that is executed in the Service Logic script and can appear in several places within the script.

Figure 8:

The TABLE GET LGO, illustrated in FIG. 8, is used to get values from a Table based on a Table Name and Index. A GUI will prompt for Index based on the Table definition. TABLE GET will output number of rows fetched from the Table matching the search criteria. The GUI will prompt for local variable(lists) names where the output values should be stored. The service developer has to specify local variables to store the output values from TABLE GET operation. On fatal error, the TABLE GET LGO terminates program execution.

TABLE 3

TABLE GET LGO Inputs/Outputs:

| I/O | Attribute | Attribute type | Display name | Default value | Possible values | Select mode |
|---|---|---|---|---|---|---|
| Input | Table | Composite SEAGUL Data Type | Service Developer declared name | NA | NA | Drop down menu with the names of declared Tables |
| | Index | One or more of SEAGUL Data Types | Service Developer declared name | NA | NA | Drop down menu with the names of indices based on Table definition |
| Output | List (s) | One or more of basic SEAGUL Data Types | NA | NA | NA | Drop down menu with the names of declared local variables (lists) that can be used to store the output values |

The TABLE GET LGO receives a token from preceding LGO, when it has finished its execution and passes a token to the next LGO when the TABLE GET LGO has executed successfully. In the On State, the TABLE GET LGO gets fired into "On State" by the token passed from the preceding LGO on a script execution list. The TABLE GET LGO turns itself off into "Off state" when it completes its function successfully. In addition, the TABLE GET LGO is turned off into "Off state" by a Service Logic execution controlling program when it encounters END in the Service Logic script. The TABLE GET LGO is always following the complete Declaration Blocks.

Figure 9:

The MEMBER OF LIST LGO, illustrated in FIG. 9, is used to check if the specified variable value is a member in the specified list of values. The GUI prompts for a variable, whose value is verified to be a member of the specified list, and it will prompt for the name of the list in which it should check for membership. The service developer should make sure that variable type and list type, are of the same types. On fatal error, the MEMBER OF LIST LGO terminates program execution.

TABLE 4

MEMBER OF LIST LGO Inputs/Outputs:

| I/O | Attribute | Attribute type | Display name | Default value | Possible values | Select mode |
|---|---|---|---|---|---|---|
| Input | Variable, whose value is checked for membership in the list | Basic SEAGUL Data Type | Service Developer declared name | NA | NA | Drop down menu with the names of declared and system variables |
| | List of values, each of which is checked to match the variable value. | Basic SEAGUL Data Types | Service Developer declared name | NA | NA | Drop down menu with the names of declared lists |
| Output | None | | | | | |

The MEMBER OF LIST LGO receives a token from preceding LGO, when it has finished its execution. The MEMBER OF LIST LGO has two execution outputs: true and false. The true output passes a token to the next LGO when a variable value is in the list. The false output passes a token to the next LGO when a variable value is not in the list. The MEMBER OF LIST LGO gets fired into "On State" by the token passed from the preceding LGO on a script execution list. The MEMBER OF LIST LGO turns itself off into "Off state" when it completes its function successfully. In addition, the MEMBER OF LIST LGO is turned off into "Off state" by a Service Logic execution controlling program when it encounters an END LGO in the Service Logic script. The MEMBER OF LIST LGO always follows the complete Variable Declaration Blocks.

Figure 10:

The TEST LGO, illustrates in FIG. 10, provides capability to check if the designated relation between two variables is True or False. The GUI prompts for variables whose values are evaluated, and it will prompt for the relationship operator. The service developer should make sure that variables compared are of the same type. On fatal error, the TEST LGO terminates program execution.

true. The TEST LGO gets fired into "On State" by the token passed from the preceding LGO on a script execution list. The TEST LGO turns itself off into "Off state" when it completes its function successfully. In addition, the TEST LGO is turned off into "Off state" by a Service Logic execution controlling program when it encounters END in the Service Logic script. The TEST LGO always follows the complete Variable Declaration Blocks.

Figure 11:

The FOR EVERY LGO, illustrated in FIG. 11, provides a capability to execute a single LGO or a sequence of LGOs, for every item from a list, or for a specified number of times. It keeps track of number of passes through the loop and continues iterations until it uses all the items from the input list, or when the number of passes is equal to a specified count. It fires an appropriate output when that number is smaller or equal to number of items on the list or it reaches

TABLE 5

TEST LGO Inputs/Outputs:

| I/O | Attribute | Attribute type | Display name | Default value | Possible values | Select mode |
|---|---|---|---|---|---|---|
| Input | Variable, whose value is evaluated in a test operation | Basic SEAGUL Data Type | Service Developer declared name | NA | NA | Drop down menu with the names of declared and system variables |
|  | Variable, whose value is evaluated in a test operation | Basic SEAGUL Data Type | Service Developer declared name | NA | NA | Drop down menu with the names of declared and system variables |
|  | Relationship Operator | Basic SEAGUL Operator Types | NA | NA | <br>=<br>==<br>><br>>= | Drop down menu with the basic operators |
| Output | None | | | | | |

The TEST LGO receives a token from a preceding LGO, when it has finished its execution. The TEST LGO has two execution outputs: true and false. The true output passes a token to the next LGO when a result of the relationship evaluation is true. The false output passes a token to the next LGO when a result of the relationship evaluation is NOT "count" (Repeat Output), or greater than number of items on the list or "count" (Done Output). LGO(s) executed within a LOOP are placed under "Repeat Output". The service developer has to select a list using GUI form, or enter "count" for the loop. On fatal error, the FOR EVERY LGO terminates program execution.

TABLE 6

FOR EVERY LGO Inputs/Outputs:

| I/O | Attribute | Attribute type | Display name | Default value | Possible values | Select mode |
|---|---|---|---|---|---|---|
| Input | List of items | SEAGUL Composite Data type | Service Developer declared name | NA | NA | Drop down menu with the names of declared lists |
|  | Count | Integer | Service Developer Declared name | NA | NA | |
| Output | Current item from the list | Any SEAGUL type | Current_item | NA | NA | |

The FOR EVERY LGO receives a token from preceding LGO, when it has finished its execution. The FOR EVERY LGO has two outputs: repeat and done. The repeat output passes a token to the next LGO to be executed within a FOR EVERY loop until specified condition is met, or until all the items from the list were used. The done output passes a token to the next LGO when a FOR EVERY execution is complete. The FOR EVERY LGO gets fired into "On State" by the token passed from the preceding LGO on a script execution list. It remains fired until it reaches the last item on the list, or until the number of passes through the loop equals the declared count. The FOR EVERY LGO turns itself off into "Off state" when it completes its function successfully. In addition, the FOR EVERY LGO is turned off into "Off state" by a Service Logic execution controlling program when it encounters END in the Service Logic script. The FOR EVERY LGO always follows the complete Variable Declaration Blocks.

Figure 12:

The REPEAT LGO, illustrated in FIG. 12, functions as a delimiter for a FOR EVERY LGO. It transfers LGO execution back to FOR EVERY block, which depending on the current count can pass the token to one of its outputs. The FOR EVERY LGO keeps track of number of passes through the loop. On fatal error, the REPEAT LGO terminates program execution.

TABLE 7

REPEAT LGO Inputs/Outputs:

| I/O | Attribute | Attribute type | Display name | Default value | Possible values | Select mode |
|---|---|---|---|---|---|---|
| Input | None | | | | | |
| Output | None | | | | | |

The REPEAT LGO receives a token from preceding LGO, when it has finished its execution. The REPEAT LGO has no outputs. The REPEAT LGO gets fired into "On State" by the token passed from the preceding LGO on a script execution list. The REPEAT LGO turns itself off into "Off state" when it completes its function successfully. In addition, the REPEAT LGO is turned off into "Off state" by a Service Logic execution controlling program when it encounters END in the Service Logic script. The REPEAT LGO always complements preceding (not necessarily directly) FOREVERY LGO.

Figure 13:
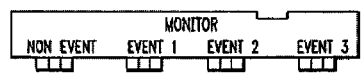

The MONITOR LGO, illustrated in FIG. 13, arms the triggers and monitors for specified events. Triggers to monitor for several events can be armed in one LGO Block. The system developer must identify Event Precedence to resolve a possible race condition, which may appear when several events may happen simultaneously. On fatal error, the MONITOR LGO terminates program execution.

TABLE 8

MONITOR LGO Inputs/Outputs:

| I/O | Attribute | Attribute type | Display name | Default value | Possible values | Select mode |
|---|---|---|---|---|---|---|
| Input | Call id | System variable | Call id | | | |
| Input | Event | System variable | Event | | DTMF digits (specified by the user) | Drop down list to select event (with assigned or to be provisioned value) from a list of declared event types. |
| | Event Precedence | List | Event Precedence | | | Drop down list with selected events, which can be moved up or down according to assigned priority (first on the list has the highest priority). |
| Output | None | | | | | |

The MONITOR LGO receives a token from a preceding LGO, when it has finished its execution. The MONITOR LGO has four outputs: no event, event1, event2, and event3. The no event output passes a token to the next LGO when the MONITOR LGO executed successfully. The event1 output gets fired first due to the highest priority assigned to Event1 on the list of events for which triggers are set, in case if there are two or more concurrent events. The event2 output gets fired second due to the lower priority assigned to Event2 on the list of events for which triggers are set, in case if there are two or more concurrent events. The event3 output gets fired last due to the lowest priority assigned to Event3 on the list of events for which triggers are set, in case if there are two or more concurrent events. The MONITOR LGO gets fired into "On State" by the token passed from the preceding LGO on a script execution list. The MONITOR LGO is turned off into "Off state" by a Service Logic execution controlling program when it encounters END in the Service Logic script. The Monitor LGO is preceded by Connect, or Originate LGOs.

Figure 14:

The CONNECT LGO, illustrated in FIG. 14, provides capability to establish a path between a caller and a callee. It requires that call be originated by the caller and not by the service logic. Another block will provide capability tho initiate a service by a third party or a specified event. It can fire answer, busy, no answer and hang up outputs. It should fire only one of answer, busy and no answer output during each invocation. It may fire hang up when called party (destination for connect) hangs up during service execution. On fatal error, the CONNECT LGO terminates program execution.

The CONNECT LGO receives a token from a preceding LGO, when it has finished its execution. The CONNECT LGO has four outputs: busy, no answer, answer, and hang up. The busy output passes a token to the next LGO when the destination is "busy". The no answer output passes a token to the next LGO when the destination has not answered after a specified number of rings, which is defined as input attribute. The answer output passes a token to the next LGO when the destination is "connected". The hang up output passes a token to the next LGO when the destination hungs up. The CONNECT LGO gets fired into "On State" by the token passed from the preceding LGO on a script execution list. It remains fired in "On state" until one of the following happens: there is Busy Event notification, No Answer Event notification, or Answer Event notification. The CONNECT LGO turns itself off into "Off state" when there is a Busy Event notification, or when there is No Answer Event notification, or when there is Callee Hang up Event notification. In addition, the CONNECT LGO is turned off into "Off state" by a Service Logic execution controlling program when it encounters END in the Service Logic script. The CONNECT LGO can not precede Begin and Variable Declaration blocks.

Figure 15:
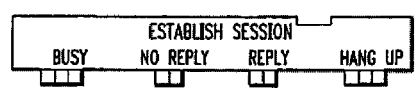

The ESTABLIH SESSION LGO, illustrated in FIG. 15, provides capability to establish a session for the exchange of data between two applications. It requires that session is originated by the application itself, or by the service logic. It can fire reply, busy, no reply and hang up output. It should fire only one of reply, busy and no reply output during each invocation. It may fire hang up when called party (destination application for establishing the session) hangs up during

TABLE 9

CONNECT LGO Inputs/Outputs:

| I/O | Attribute | Attribute type | Display name | Default value | Possible values | Select mode |
|---|---|---|---|---|---|---|
| Input | Origination end point | Address | Destination | ANI | E.164 (type) CC + NN (values), where CC (1, 2, 3 digits), NN (up to 12 digits), IP address (type) 145.domainname.com (value) | Drop down list to select type and variable (with assigned or to be provisioned value) from a list of declared variables. |
| Input | Destination end point | Address | Destination | DN | E.164 (type) CC + NN (values), where CC (1, 2, 3 digits), NN (up to 12 digits), IP address (type) 145.domainname.com (value) | Drop down list to select type and variable (with assigned or to be provisioned value) from a list of declared variables. |
|  | Number of rings to be used for "no answer" | Integer | Number of rings | 3 | 1 to 9 | Drop down list |
| Output | None | | | | | | service execution. On fatal error, the ESTABLISH SESSION LGO terminates program execution.

TABLE 10

ESTABLISH SESSION LGO Inputs/Outputs:

| I/O | Attribute | Attribute type | Display name | Default value | Possible values | Select mode |
|---|---|---|---|---|---|---|
| Input | Origination end point (application name, IP host address) | Address | Origination | DN | Application name, IP address (type) 145.domainname.com (value) | Drop down list to select type and variable (with assigned or to be provisioned value) from a list of declared variables. |
| Input | Destination end point (application name, IP host address) | Address | Destination | DN | Application name, IP address (type) 145.domainname.com (value) | Drop down list to select type and variable (with assigned or to be provisioned value) from a list of declared variables. |
| Input | Number of tries | Integer | Number of tries | 3 | | |
| Output | None | | | | | |

The ESTABLISH SESSION LGO receives a token from preceding LGO, when it has finished its execution. The ESTABLISH SESSION LGO has four outputs: busy, no reply, reply, and hang up. The busy output passes a token to the next LGO when the destination application is "busy". The No reply output passes a token to the next LGO when the destination application is not replying after number of tries attempts. The reply output passes a token to the next LGO when the destination application is virtually connected. The hang up output passes a token to the next LGO when the destination application hangs up. The ESTRABLISH SESSION LGO gets fired into "On State" by the token passed from the preceding LGO on a script execution list. It remains fired in "On state" until one of the following happens: there is Busy Event notification, No Reply Event notification, or Reply Event notification. The ESTRABLISH SESSION LGO turns itself off into "Off state" when there is a Busy Event notification, or when there is No Reply Event notification, or when there is Destination Application Hang up Event notification. In addition, the ESTRABLISH SESSION LGO is turned off into "Off state" by a Service Logic execution controlling program when it encounters END in the Service Logic script. The ESTABLISH SESSION LGO can not precede Begin block.

Figure 16:

The MAIL LGO, illustrated in FIG. 16, provides a capability to send, or retrieve a mail message. Both inputs to this LGO are System variables. On fatal error, the MAIL LGO terminates program execution.

TABLE 12

MAIL LGO Inputs/Outputs:

| I/O | Attribute | Attribute type | Display name | Default value | Possible values | Select mode |
|---|---|---|---|---|---|---|
| Input | Destination end point (addressee mail address) | Address | Mail address | DA | IP address (type) User@145.domainname.com (value) | Drop down list to select type and variable (with assigned or to be provisioned value) from a list of declared variables. |
| Input | Origination end point (sender's mail address) | Address | Mail address | DA | IP address (type) User@145.domainname.com (value) | Drop down list to select type and variable (with assigned or to be provisioned value) from a list of declared variables. |
| Input | Attachment | File | Attachment | File name | .doc, .ppt, .wav | |

TABLE 12-continued

MAIL LGO Inputs/Outputs:

| I/O | Attribute | Attribute type | Display name | Default value | Possible values | Select mode |
|---|---|---|---|---|---|---|
| Input | Procedure | String | Mail | Send mail | Send mail, Read mail | Drop down list to select type and variable (with assigned or to be provisioned value) from a list of declared variables |
| Output | None | | | | | |

The MAIL LGO receives a token from preceding LGO, when it has finished its execution. The MAIL LGO passes a token to the next LGO when the MAIL LGO is executed successfully. The MAIL LGO gets fired into "On State" by the token passed from the preceding LGO on a script execution list. The MAIL LGO turns itself off into "Off state" when it completes its function successfully. In addition, the MAIL LGO is turned off into "Off state" by a Service Logic execution controlling program when it encounters END in the Service Logic script. The MAIL LGO must be preceded by BEGIN LGOs.

The ORIGINATE TO LGO, illustrated in FIG. 1, provides capability to initiate a call to the Destination Number. It requires that call must be originated by the service logic. It can fire answer, busy, no answer and hang up output. It should fire only one of answer, busy and no answer outputs during each invocation. It may fire hang up when called party (destination for connect) hangs up during service execution. SLEE will assign a new Call_leg_id for the newly established call leg, in case of "answer". On fatal error, the ORIGINATE TO LGO terminates program execution.

The ORIGINATE TO LGO receives a token from a preceding LGO, when it has finished its execution. The ORIGINATE TO LGO has four outputs: busy, no answer, answer, and hang up. The busy output passes a token to the next LGO when the destination is "busy". The no answer output passes a token to the next LGO when the destination is not answered after a number of rings specified as an input attribute. The answer output passes a token to the next LGO when the destination is "connected". The hang up output passes a token to the next LGO when the destination hangs up. The ORIGINATE TO LGO gets fired into "On State" by the token passed from the preceding LGO on a script execution list. It remains fired in "On state" until one of the following happens: there is Busy Event notification, No Answer Event notification, or Answer Event notification. The ORIGINATE TO LGO turns itself off into "Off state" when there is a Busy Event notification, or when there is No Answer Event notification, or when there is Callee Hang up Event notification. In addition, the ORIGINATE TO LGO is turned off into "Off state" by a Service Logic execution controlling program when it encounters END in the Service Logic script. The ORIGINATE TO LGO can not precede Begin block.

TABLE 13

ORIGINATE TO LGO Inputs/Outputs:

| I/O | Attribute | Attribute type | Display name | Default value | Possible values | Select mode |
|---|---|---|---|---|---|---|
| Input | Destination end point | Address | Destination | DN | E.164 (type) CC + NN (values), where CC (1, 2, 3 digits), NN (up to 12 digits), IP address (type) 145.domainname.com (value) | Drop down list to select type and variable (with assigned or to be provisioned value) from a list of declared variables. |
| | Number of rings to be used for "no answer" | Integer | Number of rings | 3 | 1 to 9 | Drop down list |
| Output | None | | | | | |

Figure 17:

The JOIN LGO, illustrated in FIG. 17, adds a call party or a group of call parties from the current group into existing call group. Both inputs to this LGO are System variables. On fatal error, the JOIN LGO terminates program execution.

TABLE 14

JOIN LGO Inputs/Outputs:

| I/O | Attribute | Attribute type | Display name | Default value | Possible values | Select mode |
|---|---|---|---|---|---|---|
| Input | Existing call party or group identifier | System variable | Call id | | | |
| | To be added call party or group identifier | System variable | Call id | | | |
| Output | None | | | | | |

The JOIN LGO receives a token from a preceding LGO, when it has finished its execution. The JOIN LGO passes a token to the next LGO when the JOIN LGO is executed successfully. The JOIN LGO gets fired into "On State" by the token passed from the preceding LGO on a script execution list. The JOIN LGO turns itself off into "Off state" when it completes its function successfully. In addition, the JOIN LGO is turned off into "Off state" by a Service Logic execution controlling program when it encounters END in the Service Logic script. The JOIN LGO must be preceded by Connect, or Originate LGOs.

Figure 18:

The DISCONNECT LGO, illustrated in FIG. 18, provides capability to tear down a path between two end points (origination and destination end points). On fatal error, the DISCONNECT LGO terminates program execution.

TABLE 15

DISCONNECT LGO Inputs/Outputs:

| I/O | Attribute | Attribute type | Display name | Default value | Possible values | Select mode |
|---|---|---|---|---|---|---|
| Input | Destination end point | Address | Destination | DN | E.164 (type) CC + NN (values), where CC (1, 2, 3 digits), NN (up to 12 digits), IP address (type) 145.domainname.com (value) | Drop down list to select type and variable (with assigned or to be provisioned value) from a list of declared variables. |
| | Call party identifier | System variable | Call id | | | |
| Output | None | | | | | |

The DISCONNECT LGO receives a token from a preceding LGO, when it has finished its execution. The DISCONNECT LGO passes a token to the next LGO when the Disconnect is executed successfully. The DISCONNECT LGO gets fired into "On State" by the token passed from the preceding LGO on a script execution list. The DISCONNECT LGO turns itself off into "Off state" when it completes its function successfully. In addition, the DISCONNECT LGO is turned off into "Off state" by a Service Logic execution controlling program when it encounters END in the Service Logic script. The DISCONNECT LGO must be preceded by Connect, or Originate LGOs.

Figure 19:

The DROP CALL LGO, illustrated in FIG. 19, provides capability to tear down a call with all of its call legs, being disconnected. On fatal error, the DROP CALL LGO terminates program execution.

TABLE 16

DROP CALL LGO Inputs/Outputs:

| I/O | Attribute | Attribute type | Display name | Default value | Possible values | Select mode |
|---|---|---|---|---|---|---|
| Input | Call party identifier | System variable | Call id | | | |
| Output | None | | | | | |

The DROP CALL LGO receives a token from a preceding LGO, when it has finished its execution. The DROP CALL LGO passes a token to the next LGO when the Drop is executed successfully. The DROP CALL LGO gets fired into "On State" by the token passed from the preceding LGO on a script execution list. The DROP CALL LGO turns itself off into "Off state" when it completes its function successfully. In addition, the DROP CALL is turned off into "Off state" by a Service Logic execution controlling program when it encounters END in the Service Logic script. The DROP CALL must be preceded by Connect, or Originate LGOs.

Figure 20:

The LOG LGO, illustrated in FIG. 20, provides a capability to store identified information, which is associated with a given call instance. Data is collected throughout the call duration, whenever LOG is invoked in a script. It is assumed that only data stored here is the data relevant to the service features, and not to a plain PSTN call. The service developer has to identify types of events and data, that is logged to the file. The service developer has to provide name of the log file, where all the information will be stored. On fatal error, the LOG LGO terminates program execution.

The LOG LGO receives a token from a preceding LGO, when it has finished its to execution. The LOG LGO passes a token to the next LGO when Log is executed successfully. The LOG LGO gets fired into "On State" by the token passed from the preceding LGO on a script execution list. The LOG LGO turns itself off into "Off state" when it completes its function successfully. In addition, the LOG LGO is turned off into "Off state" by a Service Logic execution controlling program when it encounters END in the Service Logic script.

Figure 21:

The PLAY LGO, illustrated in FIG. 21, provides a call party with call and network relevant information. It plays announcements which are designed by the service developer, and which are either available or have to be recorded during service provisioning process. The service developer has to make sure that announcement is associated with appropriate announcement id, which plays the desired message. On fatal error, the PLAY LGO terminates program execution.

TABLE 17

LOG LGO Inputs/Outputs:

| I/O | Attribute | Attribute type | Display name | Default value | Possible values | Select mode |
|---|---|---|---|---|---|---|
| Input | Date | Date | Time of event | Current time | (0-24 hr): (0-60 min) | System Variable |
| | Time | Time | Date of event | Current date | (0-12)/(1-31)/(1999-2005) | System Variable |
| | Call Id | Call id | Call id | | | System Variable |
| | Origination end point | Address | Origination | ANI | E.164 (type) CC + NN (values), where CC (1, 2, 3 digits), NN (up to 12 digits), IP address (type) 145.domainname.com (value) | Drop down list to select type and variable (with assigned or to be provisioned value) from a list of declared variables. |
| | Destination end point | Address | Destination | ANI | E.164 (type) CC + NN (values), where CC (1, 2, 3 digits), NN (up to 12 digits), IP address (type) 145.domainname.com (value) | Drop down list to select type and variable (with assigned or to be provisioned value) from a list of declared variables. |
| | Element/Event | Composite (type, value) | Service Developer | Feature name | Feature name, Connect, Disconnect, Trigger | Drop down list |
| Output | Log file | | | | | |

TABLE 18

PLAY LGO Inputs/Outputs:

| I/O | Attribute | Attribute type | Display name | Default value | Possible values | Select mode |
|---|---|---|---|---|---|---|
| Input | Announcement id | Integer | Service Developer gives the name | NA | Any Integer (depends on IVR provisioning) | |
| | Repetition requested | Integer | Repetition | 1 | 0, 1 | Drop down menu |
| | Repetition Interval | Time | Interval | 5 seconds | 0-60 seconds | Drop down menu |
| | Maximum number of repetitions | Integer | Number of repetitions | 1 | 1, 2, 3, 4, 5 | Drop down menu |
| | Origination end point | Address | Origination | ANI | E.164 (type) CC + NN (values), where CC (1, 2, 3 digits), NN (up to 12 digits). IP address (type) 145.domainname.com (value) | Drop down list to select type and variable (with assigned or to be provisioned value) from a list of declared variables. |
| Output | None | | | | | |

The PLAY LGO receives a token from a preceding LGO, when it has finished its execution. The PLAY LGO passes token to the next LGO when PLAY executed successfully. The PLAY LGO gets fired into "On State" by the token passed from the preceding LGO on a script execution list. The PLAY LGO turns itself off into "Off state" when it completes its function successfully. In addition, the PLAY LGO is turned off into "Off state" by a Service Logic execution controlling program when it encounters END in the Service Logic script.

Figure 22:
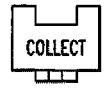

The COLLECT LGO, illustrated in FIG. 22, provides a call party with call and network relevant information and collects information from the user. Also, it includes timers for digit collection built within its functionality. It plays announcements which are designed by the service developer, and which are either available or have to be recorded during service provisioning process. The service developer has to make sure that announcement is associated with appropriate announcement id, which plays desired message. On fatal error, the COLLECT LGO terminates program execution.

TABLE 19

COLLECT LGO Inputs/Outputs:

| I/O | Attribute | Attribute type | Display name | Default value | Possible values | Select mode |
|---|---|---|---|---|---|---|
| Input | Announcement id | Integer | Service Developer gives the name | NA | Any Integer (depends on IVR provisioning) | |
| | Repetition requested | Integer | Repetition | 0 (no requested repetition) | 0, 1 | Drop down menu |
| | Repetition Interval | Time | Interval | 5 seconds | 0-60 seconds | Drop down menu |
| | Maximum number of repetitions | Integer | Number of repetitions | 1 | 1, 2, 3, 4, 5 | Drop down menu |
| | Origination end point | Address | Origination | ANI | E.164 (type) CC + NN (values), where CC (1, 2, 3 digits), NN (up to 12 digits), IP address (type) 145.domainname.com (value) | Drop down list to select type and variable (with assigned or to be provisioned value) from a list of declared variables. |
| | User Interruptibility | Integer | Interruptibility | 0 (no interuptibility) | 0, 1 | Drop down menu |
| | Voice feedback from user | Integer | Voice feedback | 0 (no feedback) | 0, 1 | Drop down menu |
| | Maximum number of characters | Integer | Maximum number of characters | 12 | 20 | Drop down menu |
| | Minimum number of characters | Integer | Minimum number of characters | 10 | 20 | Drop down menu |
| | Initial input waiting timer | Time | Input timer | 30 seconds | 60 seconds | Drop down menu |

TABLE 19-continued

COLLECT LGO Inputs/Outputs:

| I/O | Attribute | Attribute type | Display name | Default value | Possible values | Select mode |
|---|---|---|---|---|---|---|
|  | Inter-character waiting timer | Time | Inter-digit timer | 30 seconds | 60 seconds | Drop down menu |
|  | End delineator | string | End delineator | # | Any alphanumeric | Drop down menu |
|  | Format of data to be received from user | string | format | E.164 | E.164<br>IP address<br>Credit Card number<br>PIN<br>Boolean (yes, no) | Drop down menu |
| Output | Data collected from user | String | User data | E.164 | E.164<br>IP address<br>Credit Card number<br>PIN<br>Boolean (yes, no |  |

The COLLECT LGO receives a token from a preceding LGO, when it has finished its execution. The COOLECT LGO passes a token to the next LGO when COLLECT is executed successfully. The COLLECT LGO gets fired into "On State" by the token passed from the preceding LGO on a script execution list. The COLLECT LGO turns itself off into "Off state" when it completes its function successfully. In addition, the COLLECT LGO is turned off into "Off state" by a Service Logic execution controlling program when it encounters END in the Service Logic script. The COLLECT LGO follows after complete Declaration blocks.

Figure 23:

The WAIT LGO, illustrated in FIG. 23, stops temporarily service logic script execution script for unspecified amount of time. The service developer can specify the amount of time for a pause as an input to this LGO block. On fatal error, the WAIT LGO terminates program execution.

TABLE 20

WAIT LGO Inputs/Outputs:

| I/O | Attribute | Attribute type | Display name | Default value | Possible values | Select mode |
|---|---|---|---|---|---|---|
| Input | Time (optional) | Time | Wait time | Not specified |  | Type in number |
| Output | None |  |  |  |  |  |

The WAIT LGO receives a token from a preceding LGO, when it has finished its execution. The Wait LGO passes a token to the next LGO when WAIT is executed successfully. The WAIT LGO gets fired into "On State" by the token passed from the preceding LGO on a script execution list. The WAIT LGO turns itself off into "Off state" when the specified pause time expires. In addition, the WAIT LGO is turned off into "Off state" by a Service Logic execution controlling program when it encounters END in the Service Logic script. The WAIT LGO follows Variable declaration blocks.

Service Logic Design Examples

The use of various LGOs to create various features and services will now be explained with reference to FIGS. 24-27 which illustrate a call "Follow-Me" service and a "Restricted Calling" service. It will be understood that these services are illustrative and not restrictive and one embodiment of the invention encompasses the ability of a service developer to combine any number of LGOs into a variety of services.

Figure 24:
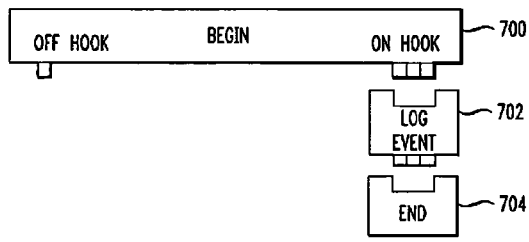
FIG. 24 illustrates a partial Service Logic Script for a "follow me" service according to one embodiment of the present invention.
Figure 25:
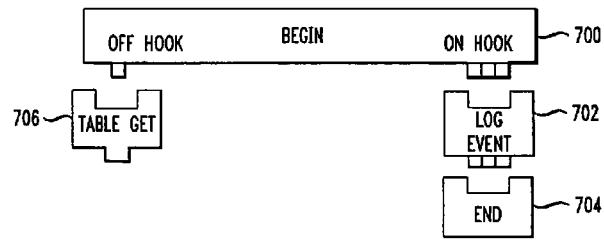
FIG. 25 illustrates a partial Service Logic Script for a "follow me" service according to one embodiment of the present invention.
Figure 26:
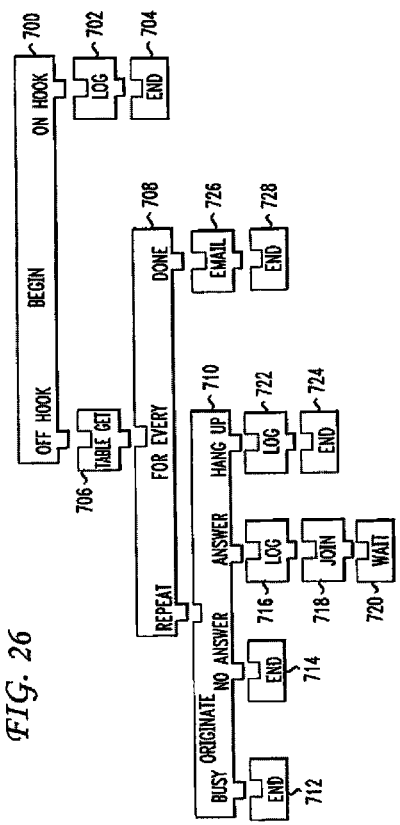
FIG. 26 illustrates a Service Logic Script for a "follow me" service according to one embodiment of the present invention.

FIGS. 24-26 illustrate the creation of the Service Logic Script for the "Follow Me" service, for example. The service allows the service subscriber to identify destination numbers where he/she can be reached at a given time of the day. For example, when the service subscriber subscribes to the service, the subscriber will be prompted, for example by a form on a GUI or some other known manner, to enter a list of telephone numbers and other information which is stored in a table in a data repository.

The service developer begins assembling the script with a BEGIN LGO 700, which starts the logic when a caller goes Off-hook. If the caller goes On-hook, the call is logged for Service Billing purposes in LOG LGO 702 and the call is terminated in the END LGO 704, as illustrated in FIGS. 24-26.

The service developer determines, if there is any need for service and customer related data. He/she has to create a table with destination number values in it, and time of the day acting as a key for data retrieval. The table is created automatically in the data repository, and is available for service subscriber self provisioning (modification) process as noted above. When the service is invoked, the table has to be retrieved to determine the destination number, at the time when a call is made. The TABLE GET LGO 706 performs this function. It provides the destination number for a given time of the day as an output attribute, which is available to other blocks as their input attribute.

The service developer has to add a LGO which will try to connect the call to each of the destination numbers listed in the table until the call is connected or all of the numbers have been tried. The FOR Every LGO 708 performs this function. The service developer has to add a LGO, which will originate a call from service logic to the retrieved destination number. The ORIGINATE LGO 710 performs this function with two input attributes: destination number and number of rings.

If the callee is busy, or there is no answer, a REPEAT LGO 712 and 714, respectively, are used to attempt to connect the call to the next destination number in the table.

If there are no more destination numbers in the list, the call is terminated in the END LGO 728. Optionally before termination, the caller can be given the opportunity to leave a voice mail or email for the callee using the MAIL LGO 726.

If the callee answers, the event is logged using the LOG LGO 716, and the two legs of the call are joined together using the JOIN LGO 718. The script gets in a wait/no operation mode until either the caller or the callee hangs up using the WAIT LGO 720. The END LGO 724 stops the script execution, and the LOG LGO 722 logs call relevant information for billing purposes when the callee hangs-up. The JOIN LGO 718 connects the two legs of the call, which have already been established; one from a caller, and second to the callee. The WAIT LGO 720 does no operation and indicates that logic is still executing, and may be waiting for event notifications from the network. A complete Service Logic Script for "Follow Me" service is illustrated in FIG. 26, however it will be understood that different versions of a "Follow-Me" service can be created using LGOs connected in different orders.

Language Graphical Objects are independent of each other and they pass a token to the next object when they finish their execution. Several objects can be executing concurrently at the same time. In the "Follow ME" service, service logic script BEGIN, FOR EVERY and ORIGINATE TO pass a token and stay fired until they get an Event Notification from the network indicating that the caller or the callee has hung up.

Figure 27:
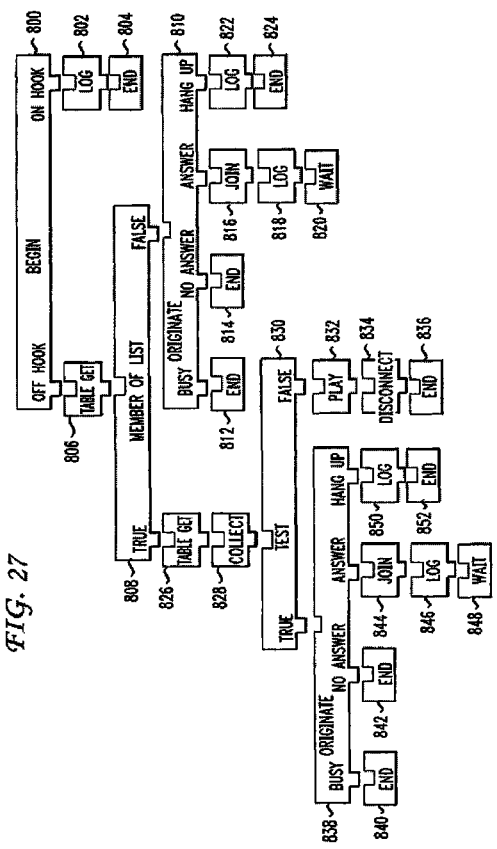
FIG. 27 illustrates a Service Logic Script for a "restricted calling" service according to one embodiment of the present invention.

FIG. 27 illustrates a "Restricted Calling" feature, which can be implemented in a communications system using a variety of LGOs. In this service, the service subscriber has created a list of destination numbers which should be restricted, i.e., can not be called without the use of a Personal Identification Number (PIN).

The service developer begins assembling the script with a BEGIN LGO 800, which starts the logic when a caller goes Off-hook. If the caller goes On-hook, the call is logged for Service Billing purposes in LOG LGO 802 and the call is terminated in the END LGO 804. Once the caller has entered the destination number, the system uses the TABLE GET LGO 806 to retrieve the list of restricted destination numbers for the particular caller. A MEMBER OF LIST LGO 808 is then used to determine if the destination number is in the list of restricted destination numbers. If the dialed destination number is not on the restricted list, an ORIGINATE LGO 810 is used to originate the call from service logic to the dialed destination number. If the callee is busy, or there is no answer, the call is terminated in END LGOs 812 and 814, respectively. If the callee answers, the event is logged using the LOG LGO 816, and the two legs of the call are joined together using the JOIN LGO 818. The script gets in a wait/no operation mode until either the caller or the callee hangs up using the WAIT LGO 820. The END LGO 824 stops the script execution, and the LOG LGO 822 logs call relevant information for billing purposes when the callee hangs-up. The JOIN LGO 818 connects the two legs of the call, which have already been established; one from a caller, and second to the callee. The WAIT LGO 820 does no operation and indicates that logic is still executing, and may be waiting for event notifications from the network.

If the dialed destination number is on the restricted list, the TABLE GET LGO 826 is fired to retrieve the stored PIN of the caller. The COLLECT LGO 828 then prompts the caller to enter the PIN number. The TEST LGO 830 then compares the entered PIN number with the stored PIN number to see if they match. If they do not match, the PLAY LGO is fired which causes a recorded message to be played for the caller, for example, indicating that the dialed destination number is on a restricted list and the PIN number previously entered is incorrect. The call is then terminated using the DISCONNECT LGO 834 and the END LGO 836.

However, if the two PIN numbers match, the ORIGINATE LGO 838 is fired to originate the call from service logic to the dialed destination number. If the callee is busy, or there is no answer, the call is terminated in END LGOs 840 and 842, respectively. If the callee answers, the event is logged using the LOG LGO 846, and the two legs of the call are joined together using the JOIN LGO 844. The script gets in a wait/no operation mode until either the caller or the callee hangs up using the WAIT LGO 848. The END LGO 852 stops the script execution, and the LOG LGO 850 logs call relevant information for billing purposes when the callee hangs-up. The JOIN LGO 844 connects the two legs of the call, which have already been established; one from a caller, and second to the callee. The WAIT LGO 848 does no operation and indicates that logic is still executing, and may be waiting for event notifications from the network.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. A method comprising:
   providing, to a computer for display, a first language graphical block representing a first computing function, wherein the first language graphical block comprises a plurality of bulges, each of the plurality of bulges representing an output for transmitting an execution token and representing a rule concerning connectivity of the first language graphical block to a second language graphical block, each of the first language graphical block and the second language graphical block representing an event driven action that can occur in a network;
   receiving, at the computer, a selection of the second language graphical block, wherein the second language graphical block comprises a plurality of notches, each of the plurality of notches representing an input for receiving the execution token and representing a rule concerning connectivity of the second language graphical block to the first language graphical block; and
   interlocking, at the computer, the first language graphical block and the second language graphical block based on the respective width of each of the plurality of bulges and the respective width of each of the plurality of notches, wherein the interlocking of each of the plurality of bulges with a respective one of the plurality of notches enforces the rule concerning connectivity of the first language graphical block and the rule concerning connectivity of the second language graphical block.

2. The method of claim 1, wherein the interlocking is further based on a number of the plurality of bulges and a number of the plurality of notches.

3. The method of claim 1, further comprising:
   generating, at the computer, a plurality of programming language objects based on the interlocking.

4. The method of claim 1, wherein a computing function associated with the first language graphical block and a computing function associated with the second language graphical block begin execution when an execution token is received.

5. The method of claim 4, wherein the computing function associated with the first language graphical block and the computing function associated with the second language graphical block execute simultaneously.

6. The method of claim 1, wherein each of the first language graphical block and the second language graphical block are associated with a service control function.

7. The method of claim 6, further comprising establishing dependencies, at the computer, between the service control function and a call control function.

8. The method of claim 7, wherein one of the service control function and the call control function are exposed through an application programming interface.

9. The method of claim 8, further comprising
providing access and control to a network resource, at the computer, during service invocation by a service subscriber through the application programming interface.

10. A method comprising:
providing, to a computer for display, a first language graphical block representing a first computing function, wherein the first language graphical block comprises a plurality of bulges, each of the plurality of bulges representing an output for transmitting an execution token and representing a rule concerning connectivity of the first language graphical block to a second language graphical block, each of the first language graphical block and the second language graphical block representing an event driven action that can occur in a network and;
providing, for display at the computer, the second language graphical block representing a second computing function, wherein the second language graphical block comprises a plurality of notches, each of the plurality of notches representing an input for receiving the execution token and representing a rule concerning connectivity of the second language graphical block to the first language graphical block; and
creating a service logic script, at the computer, in response to interlocking the first language graphical block and the second language graphical block based on the respective width of each of the plurality of bulges and the respective width of each of the plurality of notches, wherein the interlocking of each of the plurality of bulges with a respective one of the plurality of notches enforces the rule concerning connectivity of the first language graphical block and the rule concerning connectivity of the second language graphical block.

11. The method of claim 10, wherein the interlocking is further based on a number of the plurality of bulges and a number of the plurality of notches.

12. The method of claim 10, further comprising:
generating, at the computer, a plurality of programming language objects based on the interlocking.

13. The method of claim 10, wherein a computing function associated with the first language graphical block and a computing function associated with the second language graphical block begin execution when an execution token is received.

14. The method of claim 13, wherein the computing function associated with the first language graphical block and the computing function associated with the second language graphical block execute simultaneously.

15. A method comprising:
interlocking, at a computer, a first language graphical block and a second language graphical block based on a respective width of each of a plurality of bulges of the first language graphical block and a respective width of each of a plurality of notches of the second language graphical block, each of the first language graphical block and the second language graphical block representing an event driven action that can occur in a network, each of the plurality of bulges representing an output for transmitting an execution token and having a respective width representing a rule concerning connectivity of the first language graphical block to the second language graphical block, each of the plurality of notches representing an input for receiving the execution token and having a respective width representing a rule concerning connectivity of the second language graphical block to the first language graphical block, wherein the rule concerning connectivity of the first language graphical block and the second language graphical block is enforced by the interlocking and wherein the first language graphical block and the rule concerning connectivity of the second language graphical block represent service control functions used to provide a multimedia service; and
executing, at the computer, the multimedia service.

16. The method of claim 15, wherein the interlocking is further based on a number of the plurality of bulges and a number of the plurality of notches.

17. The method of claim 15, further comprising:
generating, at the computer, a plurality of programming language objects based on the interlocking.

* * * * *

UNITED STATES PATENT AND TRADEMARK OFFICE
CERTIFICATE OF CORRECTION

PATENT NO.        : 9,501,266 B2                                    Page 1 of 1
APPLICATION NO.   : 14/155468
DATED             : November 22, 2016
INVENTOR(S)       : Siroos K. Afshar et al.

It is certified that error appears in the above-identified patent and that said Letters Patent is hereby corrected as shown below:

On the Title Page

Item (54), the title, "Paradigm in Multimedia Services Creation Methodology, and New Service Creation and Service Execution Enviroments" should read --Paradigm in Multimedia Services Creation Methodology, and New Service Creation and Service Execution Environments--

Signed and Sealed this
Fourteenth Day of February, 2017

Michelle K. Lee
*Director of the United States Patent and Trademark Office*